United States Patent
Riedel et al.

(10) Patent No.: US 10,239,413 B2
(45) Date of Patent: Mar. 26, 2019

(54) METHOD FOR THE CONTACTLESS CHARGING OR DISCHARGING OF A BATTERY-OPERATED OBJECT

(71) Applicant: Robert Bosch GmbH, Stuttgart (DE)

(72) Inventors: Jan Riedel, Vaihingen an der Enz (DE); Tobias Diekhans, Stuttgart-Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/329,454

(22) PCT Filed: Jun. 22, 2015

(86) PCT No.: PCT/EP2015/063915
§ 371 (c)(1),
(2) Date: Jan. 26, 2017

(87) PCT Pub. No.: WO2016/020099
PCT Pub. Date: Feb. 11, 2016

(65) Prior Publication Data
US 2017/0320394 A1    Nov. 9, 2017

(30) Foreign Application Priority Data

Aug. 4, 2014 (DE) .......................... 10 2014 215 299

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1829* (2013.01); *B60L 11/1833* (2013.01);
(Continued)

(58) Field of Classification Search
USPC ................................ 320/107, 108, 109, 110
See application file for complete search history.

(56) References Cited

U.S. PATENT DOCUMENTS

2013/0030615 A1 * 1/2013 Ichikawa ............. B60L 11/182
701/22
2013/0335015 A1   12/2013 Ichikawa et al.
(Continued)

FOREIGN PATENT DOCUMENTS

EP       2675038      12/2013
JP       2010178499    8/2010

OTHER PUBLICATIONS

International Search Report for Application No. PCT/EP2015/063915 dated Aug. 26, 2015 (English Translation, 2 pages).

*Primary Examiner* — Brian Ngo
(74) *Attorney, Agent, or Firm* — Michael Best & Friedrich LLP

(57) ABSTRACT

The invention relates to a method for the contactless charging or discharging of a battery-operated object (4) via a magnetically coupled coil pair, comprising a primary coil (6) of a charging/discharging station (2) and a secondary coil (8) of the object (4), wherein: in a first step, the object (4) is transferred into a reference position in relation to the charging/discharging station (2); in a second step, a reference parameter is determined in the reference position; in a third step, a lateral desired offset of the object (4) to the charging/discharging station (2) is determined, based on the reference parameter; and in a fourth step, based on the lateral desired offset, the object (4) is transferred into a charging/discharging position in relation to the charging/discharging station (2) in which position the contactless charging or discharging is carried out. The invention also relates to a computer
(Continued)

program, a system (100), a charging/discharging station (2) and an object (4), which are designed to carry out the method.

9 Claims, 6 Drawing Sheets

(51) Int. Cl.
    *H02J 7/02*     (2016.01)
    *H02J 50/12*     (2016.01)
    *H02J 50/90*     (2016.01)
    *H04B 5/00*     (2006.01)

(52) U.S. Cl.
    CPC ....... B60L 11/1835 (2013.01); B60L 11/1842 (2013.01); H02J 7/025 (2013.01); H02J 50/12 (2016.02); H02J 50/90 (2016.02); H04B 5/0081 (2013.01); *B60L 2230/00* (2013.01); *B60L 2240/622* (2013.01); *B60L 2270/147* (2013.01); *H04B 5/0037* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y04S 10/126* (2013.01)

(56) References Cited

U.S. PATENT DOCUMENTS

| | | | |
|---|---|---|---|
| 2014/0092236 A1* | 4/2014 | Findeisen | G06K 9/00791 348/118 |
| 2014/0183966 A1* | 7/2014 | Suzuki | B60L 11/1831 307/104 |
| 2015/0123486 A1* | 5/2015 | Abe | H01F 27/255 307/104 |
| 2015/0155094 A1* | 6/2015 | Yasuda | H01F 38/14 361/270 |
| 2015/0236513 A1* | 8/2015 | Covic | H02J 50/40 307/104 |

\* cited by examiner

METHOD FOR THE CONTACTLESS CHARGING OR DISCHARGING OF A BATTERY-OPERATED OBJECT

BACKGROUND OF THE INVENTION

The invention relates to a method for the contactless charging or discharging of a battery-operated object, for example an electric vehicle or an electric bike. Further applications can relate, for example, to electric tools or consumer appliances.

A computer program, a system and also a charging/discharging station and a battery-operated object, which are designed to carry out the method, are further specified.

During the contactless charging or discharging process of a battery-operated object, electrical power is transmitted across an air gap. A coil pair, the coils of which are inductively coupled to one another by means of an alternating magnetic field, is used for this purpose.

The magnetically coupled coil pair can be modelled as a transformer with a large air gap. The size of the air gap influences the magnitude of stray inductances of the system and determines the degree of coupling between the coils of the coil pair, this coupling being represented as a coupling factor within the scope of the invention.

One object of the invention is to provide a method and a system for the contactless charging or discharging of a battery-operated object by means of a magnetically coupled coil pair, wherein the number of control components required in the system should be kept low.

A further object of the invention is to provide a method of this kind and a system of this kind which allow a wide range of use with a low level of complexity and low costs.

SUMMARY OF THE INVENTION

In a method according to the invention for the contactless charging or discharging of a battery-operated object by means of a magnetically coupled coil pair which comprises a primary coil, a charging/discharging station and a secondary coil of the object, it is provided that the object is moved to a reference position with respect to the charging/discharging station in a first step, a reference parameter is ascertained in the reference position in a second step, a lateral desired offset and/or a vertical desired height of the object in relation to the charging/discharging station are/is ascertained on the basis of the reference parameter in a third step, and the object is moved to a charging/discharging position with respect to the charging/discharging station, in which charging/discharging position the contactless charging or discharging takes place, on the basis of the lateral desired offset and/or the vertical desired height in a fourth step.

A position of the object with respect to the charging/discharging station can be determined using methods known from the prior art, for example with the aid of GPS, indoor GPS, optical or ultrasonic sensors, a video system or a combination thereof. A measurement of the electrical and/or magnetic parameters of the coil pair can also be used as a reference.

The object can likewise be moved to the reference position in a known manner, possibly by controlling a drive system of the battery-operated object and/or by displaying positioning instructions to persons. In the case of electric vehicles, it is possible, for example, for the means of a parking assistant to be accessed in the process. The reference position can be determined by an optimum orientation or position of the coils in relation to one another.

According to one embodiment, the reference parameter is a coupling factor or a mutual inductance which describes the quality of the magnetic coupling of the coil pair. The coupling factor or the mutual inductance can be measured by means of a current and/or voltage measurement when a reference signal is applied, that is to say when a defined current or voltage profile is applied. In this case, the defined current or voltage profile can be applied both by the battery-operated object and, as is preferred, by the charging/discharging station. The respective systemic counterpart, that is to say the charging/discharging station or the battery-operated object, measures the received current or voltage profile by means of a suitable sensor system for voltage and current. The coupling factor is ascertained from the ratio of transmitted current or voltage to received current or voltage.

According to a further embodiment of the invention, the reference parameter is a height of the object above the charging/discharging station. In the abovementioned model, the height of the object above the charging/discharging station can determine a size of an air gap between the object and the charging/discharging station, in particular between the primary and secondary coils, and therefore can be critical for the magnitude of the stray inductance. The height of the object above the charging/discharging station can be determined with the aid of a known sensor system, for example with the aid of GPS, indoor GPS or in an optical or acoustic manner, for example with the aid of camera data or ultrasound.

According to one embodiment, a lateral desired offset, that is to say a deliberate spatial offset from the reference parameter, is ascertained, for example, on the basis of a lookup table. The objective here may be to allow a relatively constant coupling factor over a changing air gap or over a changing transmission partner. This is achieved by using the lateral desired offset between the primary coil and secondary coil, which lateral desired offset is set such that a constant coupling factor is produced. The relationship between the coupling factor and the relative offset can be in the form of a functional relationship here and can be stored in the lookup table. The functional relationship between the height of the object above the charging/discharging station and the lateral desired offset can also be stored in lookup tables of this kind.

In addition to or as an alternative to the lateral desired offset, the desired height of the object in relation to the charging station given an existing actuator system is set. In the case of a vehicle, said actuator system may be, for example, an existing pneumatic suspension. The relationship between the coupling factor and the desired height can be in the form of a functional relationship here and can be stored in the lookup table. The functional relationship between the height of the object above the charging/discharging station and the desired height can also be stored in lookup tables of this kind.

After ascertaining the lateral desired offset and/or the desired height from the reference parameter, the object is moved to the charging/discharging position with respect to the charging/discharging station, for example by applying the lateral desired offset to the reference position. The means of a parking assistant may, for example, be accessed in this case. It can be provided to initiate the contactless charging or discharging after this.

As an alternative, the described method is applied once again after the lateral desired offset and/or the desired height of the object have been applied to the reference position. If the ascertained reference parameter is above or below a specific threshold value, a further lateral desired offset and/or a further desired height is ascertained on the basis of the reference parameter. The method can therefore be carried out in an iterated manner. A termination criterion may be that an ascertained reference parameter is above or below the threshold value, as a result of which the charging/discharging position with respect to the charging/discharging station is defined.

As soon as the ascertained reference value is within the desired limits, the contactless charging or discharging is initiated.

According to the invention, a computer program is further proposed, one of the methods described in this document being carried out in accordance with said computer program, wherein the computer program is run on a programmable computer device. The computer program may be, for example, a software module, a software routine or a software subroutine for implementing a charging/discharging system comprising a battery-operated object and a charging/discharging station. The computer program can be stored in the battery-operated object or in the charging/discharging station or distributed between them, in particular in permanent or rewritable machine-readable storage media or in association with a computer device, for example, in a portable memory, such as a CD-ROM, DVD, Blu-ray Disc, a USB stick or a memory card. In addition or as an alternative to this, the computer program can be provided on a computer device, such as, for example, on a server or a cloud server, for downloading, for example via a data network, such as the Internet, or via a communication connection, such as a telephone line or a wireless connection. In the case of an electric vehicle, the computer program can be stored in a control unit in the vehicle.

According to a further aspect of the invention, a system comprising a charging/discharging station, a battery-operated object and a control unit is provided, wherein the control unit is designed to move the object to a reference position with respect to the charging/discharging station, to ascertain a reference parameter in the reference position, to ascertain a lateral desired offset and/or a vertical desired height of the object in relation to the charging/discharging station on the basis of the reference parameter, to move the object to a charging/discharging position with respect to the charging/discharging station on the basis of the lateral desired offset and/or the vertical desired height, and to initiate contactless charging or discharging of the object by means of a magnetically coupled coil pair, wherein the charging/discharging station has a primary coil and the object has a secondary coil, which primary coil and secondary coil form the coil pair.

The system is preferably designed and/or set up for carrying out the described methods. Therefore, the features which are described within the scope of the methods accordingly apply to the system and, conversely, the features which are described within the scope of the system accordingly apply to the methods.

In this case, the control unit can be associated with the charging/discharging station or with the battery-operated object. As an alternative, it can be provided that both the battery-operated object and the charging/discharging station are equipped with control units which jointly carry out the method according to the invention. In particular, it can be provided that the control unit can communicate with further driver assistance systems, in particular with a parking assistant, or can access the resources of said further driver assistance systems.

According to further aspects of the invention, a charging/discharging station and also a battery-operated object are provided for use in a system of this type.

The terms "battery" and "battery-operated" are used for "rechargeable battery" and "rechargeable battery-operated", respectively, in the present description, in accordance with common parlance. In the battery, the battery cells are preferably grouped together spatially and are connected to one another in a circuit, for example interconnected in series or in parallel to form modules, in order to be able to provide the required power data using the battery cells. However, in principle, any other electrical energy storage means, for example double-layer capacitors, is conceivable.

In particular, the battery-operated object can be a motor vehicle, wherein the battery of said motor vehicle is connected to a drive system of the motor vehicle. The motor vehicle can be designed as a pure electric vehicle and can exclusively comprise an electric drive system. As an alternative, the motor vehicle can be designed as a plug-in hybrid vehicle which comprises an electric drive system and an internal combustion engine, wherein the energy storage means can be charged externally.

One advantage of the invention is that the described method and the system allow an approximately constant coupling factor over a changing air gap and/or over different transmission partners. This makes it easier to design the power electronics components in the charging/discharging station and also the coil pair. As a result, cost and/or installation space can be reduced.

Reducing the size of the value range for the coupling factor by defining a position of the battery-operated object with respect to the charging/discharging station or between them makes it possible to save costs and complexity of the system. Specific components in the system, for example additional DC/DC converters, can be entirely dispensed with owing to the presented approach, and similarly complex control strategies, for example control at both ends, that is to say a combination of active electronics systems on the primary and the secondary side, are not absolutely necessary. In this case, the additional expenditure on the invention can be rated as low since existing systems with inductive contactless energy transmission are often already equipped with positioning devices.

Furthermore, the minimum degree of efficiency of the inductive charging/discharging system given unfavorable positioning of the coil pair can be increased without additional expenditure since it can be designed for the smaller parameter range in a more targeted manner. Averaging the degree of efficiency results in a minimum/maximum response of the system being significantly reduced.

A further advantage is that the invention can be applied to a transmitter which is based on any desired principle, in particular in terms of the topology of the power electronics system and the type of primary and secondary coils used.

BRIEF DESCRIPTION OF THE DRAWINGS

Exemplary embodiments of the invention are illustrated in the drawings and explained in greater detail in the following description.

In the drawings.

In the following description of the exemplary embodiments of the invention, identical or similar components are provided with the same or similar reference symbols, wherein said components are not repeatedly described in certain cases. The figures illustrate the subject matter of the invention only schematically.

DETAILED DESCRIPTION

Figure 1:
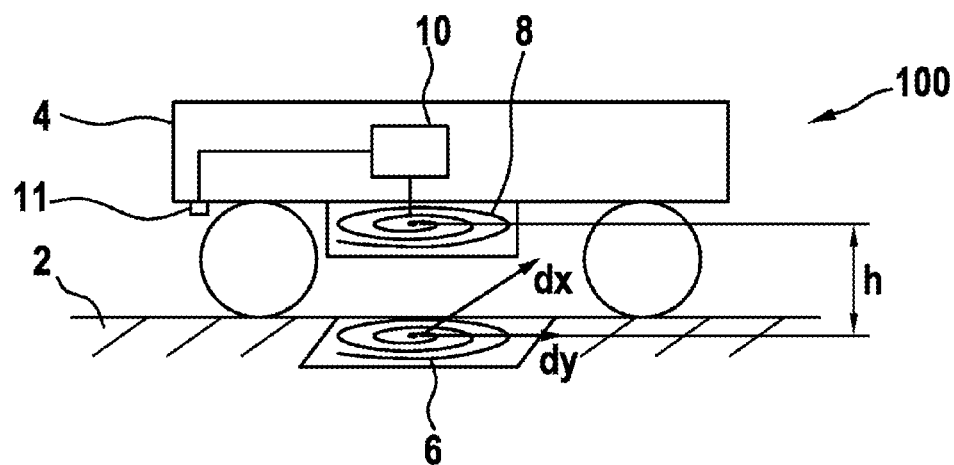
FIG. 1 shows a system comprising a battery-operated object and a charging/discharging station according to one embodiment of the invention.

FIG. 1 shows a system 100 according to the invention comprising a battery-operated object 4, for example an electric vehicle, and a charging/discharging station 2 which are arranged in a specific spatial position in relation to one another. The battery-operated object 4 is also called object 4 for short in the text which follows. In this example, the spatial position in relation to one another is described by a size h of an air gap and by a lateral offset which is measured by dx in a first direction and by dy in a second direction. The size h of the air gap can correspond to a height of the object 4 above the charging/discharging station 2.

In this embodiment, the charging/discharging station 2 has a planar primary coil 6 which is arranged in a base. The object 4 likewise has a planar secondary coil 8 by means of which a battery (not illustrated) can be charged or discharged. The primary coil 6 and the secondary coil 8 are positioned exactly one above the other for optimum energy transmission. The size h of the air gap can correspond to a size of a vertical spacing of the coils 6, 8 in relation to one another.

The power electronics systems 18, 24 in the charging/discharging station 2 and in the object 4 are typically designed for a nominal operating point and for a specific coupling factor. However, in reality, the actual operating point differs from the nominal operating point since the size h of the air gap is dependent on the site of installation of the secondary coil 8 and, for example, in the case of an electric vehicle is also dependent on the loading of the vehicle. The actual operating point or actual coupling factor also differs owing to the actual lateral offset of the coils 6, 8 in relation to one another. This makes it more difficult to design the power-electronics components and the coil pair and results in the system response having a strongly preferred operating point without the measures according to the invention, but with other operating points being put at a significant disadvantage, for example in respect of the degree of efficiency.

In the system 100 according to the invention, a control unit 100 is provided, as illustrated, for overcoming said disadvantages, said control unit being connected firstly to one of the coils 6, 8 and secondly to sensors 11, for example ultrasonic sensors.

The control unit 10 is set up to ascertain one or more reference parameters and to ascertain a lateral desired offset of the object 4 in relation to the reference position with respect to the charging/discharging station 2 on the basis of the reference parameter or reference parameters.

The control unit 10 can determine, for example, a coupling factor k, which is established by the actual position of the object 4 in relation to the charging/discharging station 2, as a reference parameter by means of the connection of the control unit 10 to one of the coils 6, 8. As an alternative or in addition to this, the control unit 10 can determine the size h of the air gap as a further reference parameter by means of the sensors 11.

Furthermore, the control unit 10 is set up to move the object 4 to a charging/discharging position on the basis of the ascertained lateral desired offset. This can be done either in an iterative process or in a direct process.

In FIG. 1, the control unit 10 is arranged on the side of the object 4. It goes without saying that some of the functions which are assigned to the control unit 10 within the scope of the invention can also run on a further control unit (not illustrated) which is associated with the charging/discharging station 2. In particular, the control unit 10 of the object 4 and the further control unit, not illustrated, of the charging/discharging station 2 can communicate with one another in order to carry out the method according to the invention.

Figure 2:
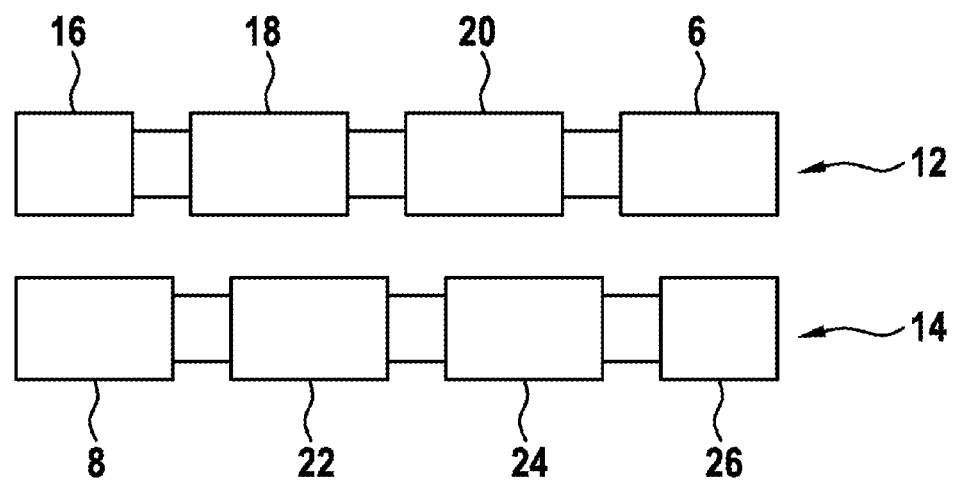
FIG. 2 is a schematic illustration of primary and secondary circuits according to one embodiment of the invention.

FIG. 2 shows a circuit according to one embodiment of the invention. A primary circuit 12 comprises a supply system 16 which comprises a current or voltage source or a plurality of interconnected current or voltage sources, for example a public power supply system. The supply system 16 is connected to a primary-side power electronics system 18 which can comprise a rectification electronics system and also possibly protective and fuse circuits. The primary circuit 12 comprises a primary-side resonant network 20 which is connected to the primary-side power electronics system 18. The primary-side resonant network 20 is connected to the primary coil 6 which represents the interface for energy transmission to the battery-operated object 4.

Within the scope of the invention, the battery-operated object 4 is referred to as being on the secondary side and the charging/discharging station 2 is referred to as being on the primary side. However, this actually applies only for the charging process. In the discharging process, the roles of the object 4 and the charging/discharging station 2 are reversed.

The secondary circuit 14 comprises the secondary coil 8 which, with the primary coil 6, forms a magnetically coupled, that is to say inductively coupled, coil pair. A secondary-side resonant network 22 is connected to the secondary coil 8. A secondary-side power electronics system 24, which comprises a rectification electronics system and possibly protective and fuse circuits, is connected to the secondary-side resonant network 22. The load 26, in particular a battery of the object 4, which battery is to be charged or discharged, is connected to the secondary-side power electronics system 24.

Figure 3:
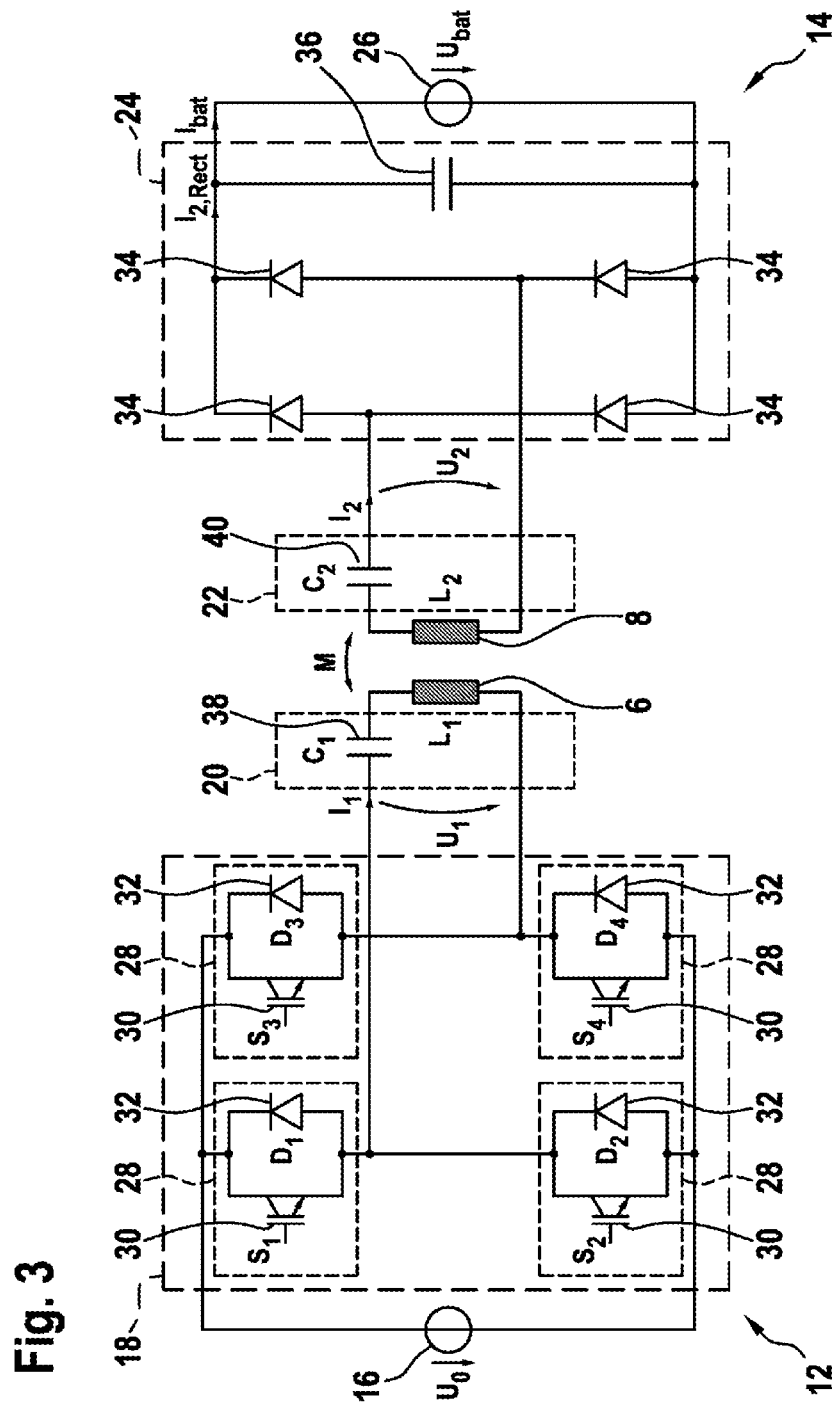
FIG. 3 is a further schematic illustration of primary and secondary circuits according to one embodiment of the invention.

FIG. 3 shows a detailed view of the primary circuit 12 and the secondary circuit 14 according to one embodiment of the invention.

The primary circuit 12 has, as supply system 16, a voltage source which provides an intermediate circuit voltage $U_0$ to the system. Said voltage source may be, for example, a rectifier with a power factor correction (PFC) filter.

Here, the primary-side power electronics system 18 comprises, by way of example, four directing elements 28 which each have a switchable transistor 30, typically an IGBT or MOSFET, and a diode 32, which transistor and diode are connected back-to-back in parallel to one another. The diode 32 can either be designed separately or integrated into a housing with the IGBT, or said diode may also be an intrinsic body diode of a MOSFET. The transistors 30 are controlled by an electronics system, not illustrated. From amongst the four directing elements 28, in each case two are connected in series with one another. The two series circuits of the directing elements 28 are connected in parallel with one another, so that a full bridge arrangement is produced overall. In each case between the two directing elements 28 which are connected in series, the voltage is supplied to the primary-side resonant network 20 which merely comprises a capacitor 38 in the form of a series resonant capacitor in this case. The primary-side resonant network 20 is fed by the first series circuit of the directing elements 28 at one end and by the second series circuit of the directing elements 28 at the second end. The primary coil 6 is located at the output end of the primary-side resonant network 20.

A capacitor 40 of the secondary-side resonant network 22 is connected to the secondary coil 8 on the side of the secondary circuit 14.

It goes without saying that the coils 6, 8 are functionally connected to the resonant networks 20, 22 in such a way that, in other words, the coils 6, 8 can be counted as belonging to the resonant networks 20, 22.

The current is supplied to the secondary-side power electronics system 24 at the output end of the secondary-side resonant network 22, said secondary-side power electronics system comprising four diodes 34 in the illustrated exemplary embodiment, said four diodes being connected to one another substantially in the same manner as the directing elements 28 in the primary-side power electronics system 18, so that a passive bridge rectifier is formed.

The secondary-side power electronics system 24 also comprises a capacitor 36 which is connected in parallel with the diodes 34, the purpose of said capacitor being to smooth the output voltage and the output current. The battery of the battery-operated object 4, the voltage $U_{bat}$ and the current $I_{bat}$ being provided to said battery, is located on the output side as load 26. Further filter elements, such as inductors or further capacitors, can be provided between an output capacitor and the battery for reasons of electromagnetic compatibility (EMC).

The secondary-side power electronics system 24 fulfils the task of rectifying the received AC signal of the secondary-side resonant network 22.

Figure 4:
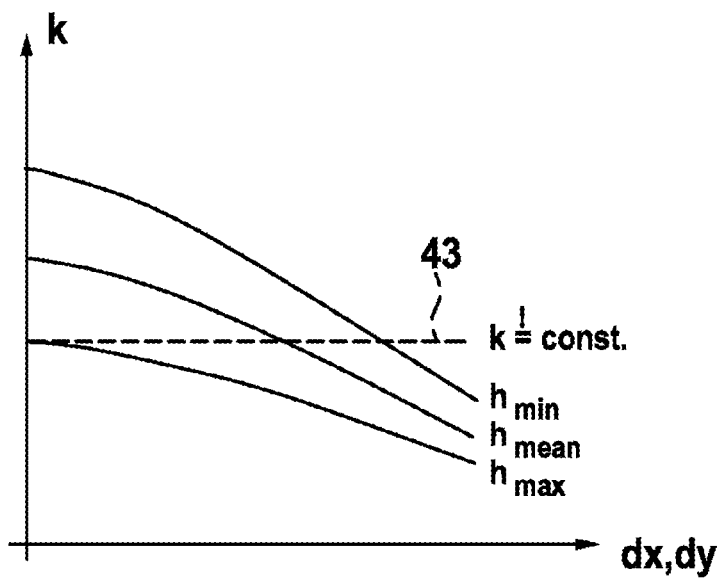
FIG. 4 is a graph showing the dependence of the coupling factor on lateral offset and height.

FIG. 4 shows the qualitative dependence of the coupling factor k on a lateral offset dx or dy. Said figure shows three curves of coupling factors which relate to a different height h of the object 4 above the charging/discharging station 2. A relatively small magnetic air gap and, as a result, a relatively high coupling factor k are produced at the minimum height $h_{min}$. The smallest coupling factor at which transmission of the rated power is still possible is produced at the maximum height $h_{max}$.

The coupling factor k exhibits a non-linear response with a monotonic fall in relation to the increasing lateral offset dx or dy.

With the method according to the invention, the lateral spacing dx or dy is set such that an approximately constant coupling factor is established even given different air gaps, as shown by line 43. Instead of this, it is also possible to provide a region in which the coupling factor is intended to be located before the charging/discharging process can be initiated.

In order to achieve a situation of the coupling factor k being constant or at least falling in the specified range, the vehicle is moved from an initial position when the air gap is too small, wherein the initial position is typically a position in which optimum energy transmission takes place, that is to say at which the coils 6, 8 are aligned with one another in an optimum manner. If, however, the air gap is large, the vehicle is positioned exactly above the primary coil 6. Although different vehicles with different ground clearances are therefore intended to be charged in these two cases, a similar coupling factor can be set in both cases.

Figure 5:
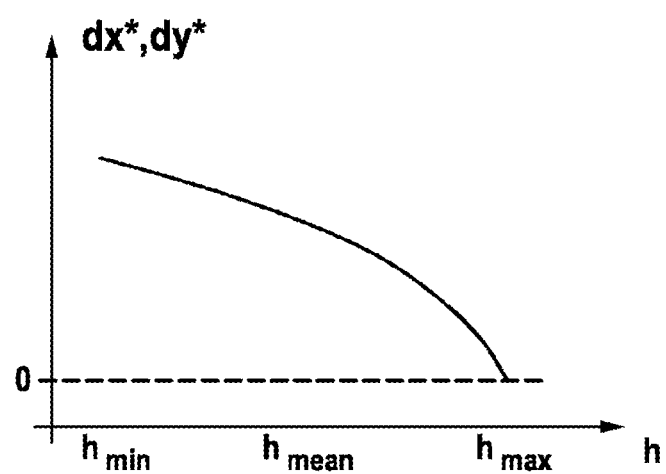
FIG. 5 is a graph showing the dependence of the lateral offset on the height.

FIG. 5 shows a dependence of a desired offset dx* or dy* on the size h of the air gap. The curve shows a non-linear monotonically falling response of the desired offset dx* or dy* from a minimum value of the size $h_{min}$ to a maximum value of the size $h_{max}$. The system determines the desired offset dx* or dy*, which is applied to the current position of the object 4, from the measurement of the size h, for example on the basis of an illustrated response of the dependence, which response is stored in the lookup table.

Figure 6:
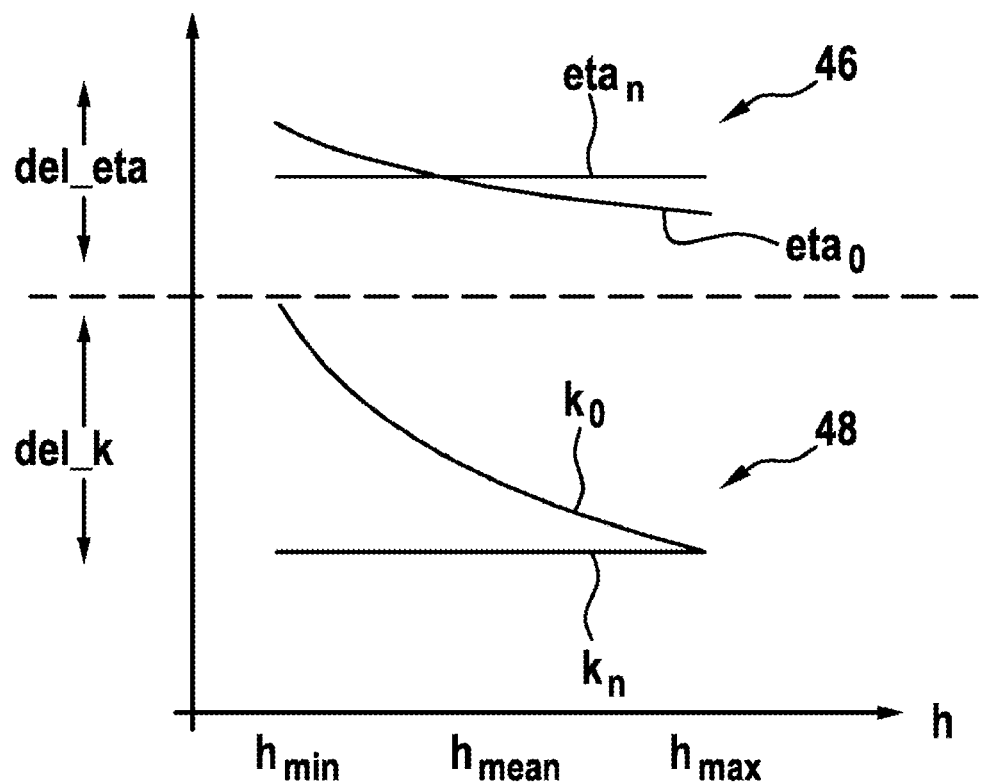
FIG. 6 is a graph showing the dependence of the degree of efficiency and the coupling factor on the air gap.

FIG. 6 shows the effect which the application of the desired offset dx* or dy* has on the current position of the object 4. The dependence of a degree of efficiency del_eta on the size h of the air gap is illustrated in an upper region 46, and the dependence of the coupling factor k on the size h of the air gap is illustrated in a lower region 48. The degree of efficiency with application of the method according to the invention is illustrated as $eta_n$ here. The degree of efficiency $eta_n$ is substantially constant, whereas the degree of efficiency $eta_o$ without application of the method according to the invention is dependent on the size h of the air gap. Similarly, the coupling factor $k_n$ after application of the method according to the invention is substantially constant, whereas the coupling factor $k_o$ without application of the method according to the invention exhibits a non-linear dependence on the size h of the air gap.

Figure 7A:
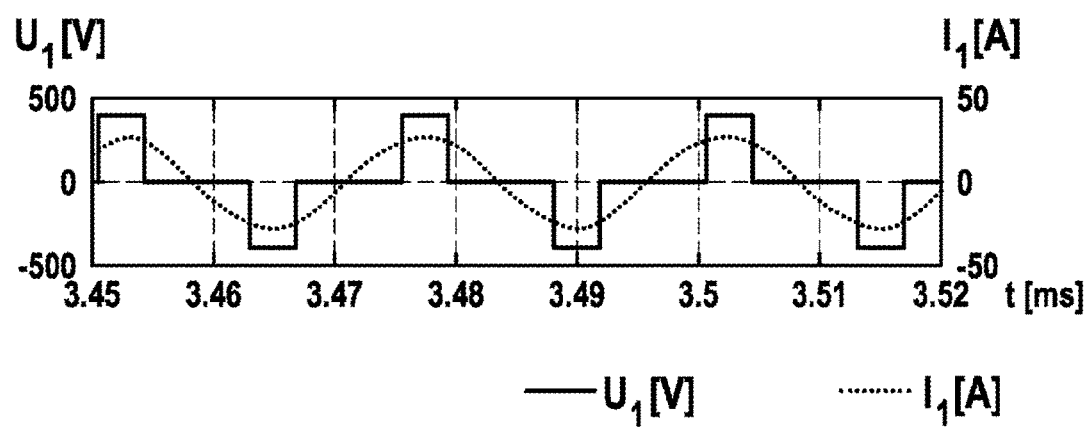
FIGS. 7A-7D show current and voltage profiles during the contactless charging or discharging according to the prior art and with the measures of the invention in comparison.
Figure 7B:
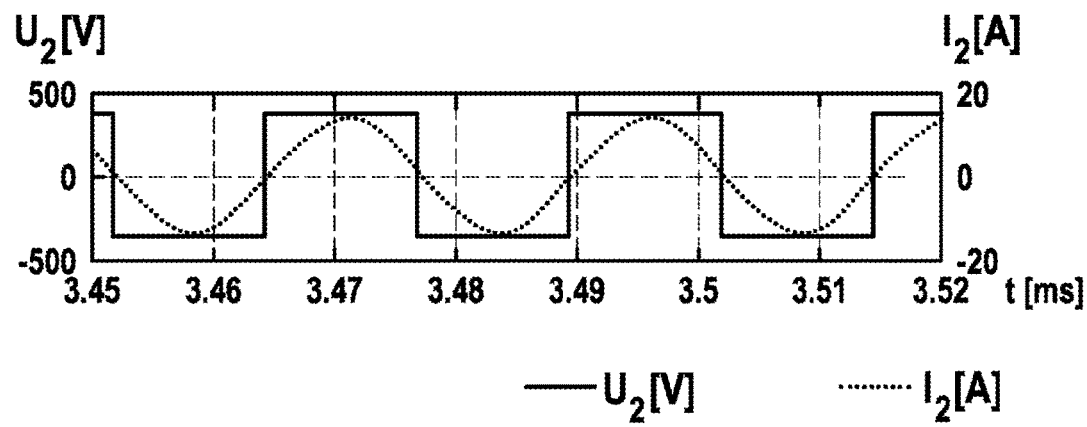
Figure 7C:
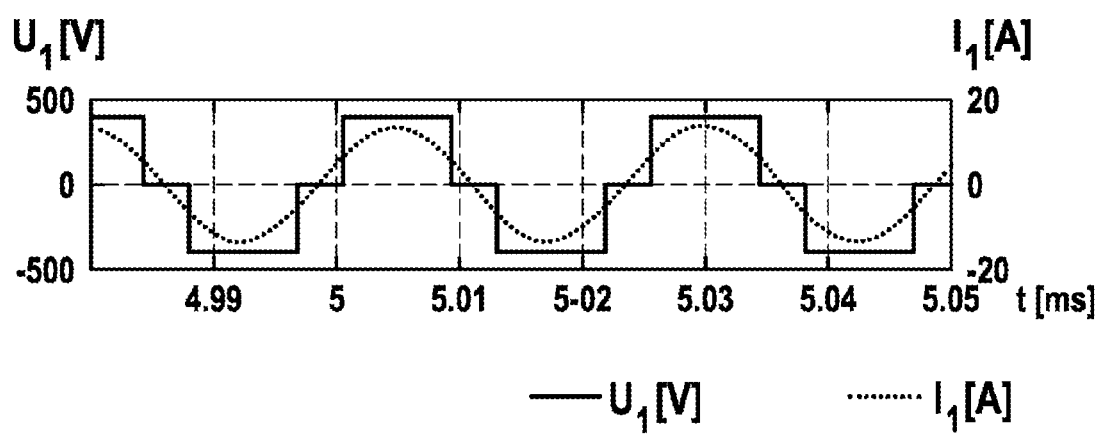
Figure 7D:
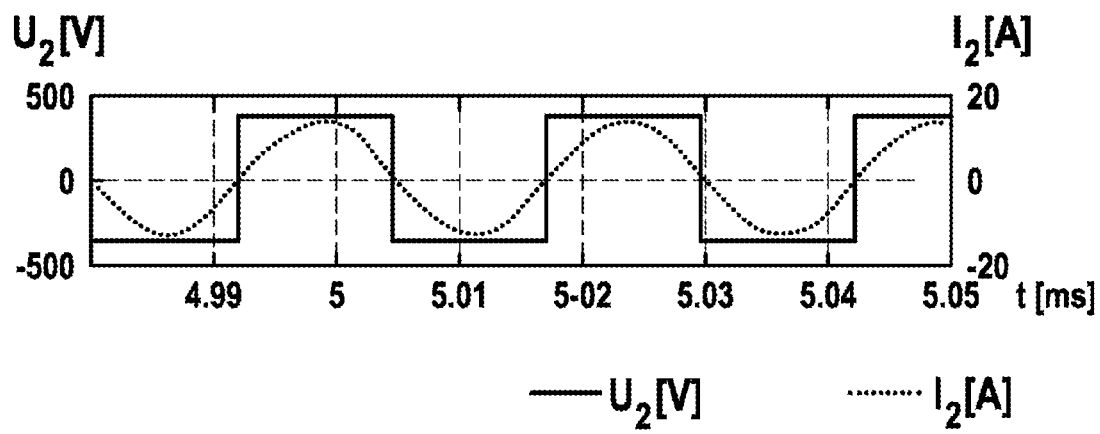

FIGS. 7A to 7D illustrate current and voltage profiles in graphs, wherein FIGS. 7A and 7B show a system 100 without application of the invention, and FIGS. 7C and 7D show a system 100 with application of the invention. The solid lines represent the voltage and the dotted lines represent the current. FIGS. 7A and 7C represent the signal in the primary circuit 12, and FIGS. 7B and 7D represent the signal in the secondary circuit 14. Both systems 100 are each designed such that the full rated power can be transmitted both given the minimum air gap $h_{min}$ and also given the maximum air gap $h_{max}$.

In this case, all profiles are based on a maximum air gap $h_{max}$ at which the charging or discharging is still functional.

FIGS. 7A and 7C show that the current in the system 100 according to the invention is considerably reduced by the primary coil 6 since the primary coil 6 can be designed with a relatively large number of turns in an optimum manner for this operating point. The primary-side power electronics system 18 switches close to the current zero crossing, which leads to substantially lower losses in the system 100. The degree of efficiency can therefore be increased and the expenditure in the primary-side power electronics system 18 can be reduced, in particular with respect to used semiconductor area of the transistors and the expenditure on cooling.

However, when the system 100, as shown in FIGS. 7A and 7B, is designed for a large coupling factor range, an unfavorable operating point for the primary-side power electronics system 18 and the primary-side resonant network 20 is established given the maximum air gap $h_{max}$. The current in the inverter is at maximum and leads to high losses in the power semiconductors.

However, when the system 100 is designed only for a small coupling factor range, as illustrated in FIGS. 7C and 7D, a more favorable operating point is produced given the maximum air gap $h_{max}$, even if the absolute coupling factor in both cases is identical.

The invention is not restricted to the exemplary embodiments described here and the aspects highlighted therein.

Rather, a large number of modifications which are within the capabilities of a person skilled in the art are possible within the scope specified by the claims.

The invention claimed is:

1. A method for the contactless charging or discharging of a battery-operated object (4) by means of a magnetically coupled coil pair which comprises a primary coil (6) of a charging/discharging station (2) and a secondary coil (8) of the object (4), the method comprising:
   moving an object (4) to a reference position with respect to the charging/discharging station (2),
   ascertaining a reference parameter in the reference position,
   when the reference parameter does not meet a threshold value, ascertaining a lateral desired offset of the object (4) from the reference position, a vertical desired height of the object (4) from the reference position, or both based on the reference parameter, and
   moving the object (4) from the reference position to a charging/discharging position with respect to the charging/discharging station (2), based on the lateral desired offset, the vertical desired-height, or both.

2. The method as claimed in claim 1, wherein the reference parameter is a coupling factor or a mutual inductance which describes the quality of the magnetic coupling of the coil pair.

3. The method as claimed in claim 2, wherein the coupling factor or the mutual inductance is measured by means of a current and/or voltage measurement when a reference signal is applied.

4. The method as claimed in claim 1, wherein the reference parameter is a height of the object (4) above the charging/discharging station (2).

5. The method as claimed in claim 1, wherein the lateral desired offset, the vertical desired height, or both are ascertained from the reference parameter by means of a lookup table.

6. The method as claimed in claim 1, wherein the method is carried out in an iterative manner.

7. A non-transitory computer readable medium including instructions that when run on a programmable computer cause the computer to
   control a drive to move an object (4) to a reference position with respect to the charging/discharging station (2),
   ascertain a reference parameter in the reference position,
   when the reference parameter does not meet a threshold value, ascertain a lateral desired offset of the object (4) from the reference position, a vertical desired height of the object (4) from the reference position, or both based on the reference parameter, and
   control the drive or an actuator to move the object (4) from the reference position to a charging/discharging position with respect to the charging/discharging station (2), based on the lateral desired offset, the vertical desired height, or both.

8. A system (100) comprising a charging/discharging station (2), a battery-operated object (4) and a control unit (10), wherein the control unit (10) is designed
   to move the object (4) to a reference position with respect to the charging/discharging station (2),
   to ascertain a reference parameter in the reference position,
   to ascertain, when the reference parameter does not meet a threshold value, a lateral desired offset from the reference position, a vertical desired height of the object from the reference position, or both based on the reference parameter,
   to move the object (4) from the reference position to a charging/discharging position with respect to the charging/discharging station (2) based on the lateral desired offset, the vertical desired height, or both, and
   to initiate contactless charging or discharging of the object (4) by means of a magnetically coupled coil pair,
   wherein the charging/discharging station (2) has a primary coil (6), the object (4) has a secondary coil (8), and the primary coil and the secondary coil form the coil pair.

9. A battery-operated object (4) for use in a system (100) comprising
   a charging/discharging station (2),
   the battery-operated object (4) and
   a control unit (10), wherein the control unit (10) is designed
   to move the object (4) to a reference position with respect to the charging/discharging station (2),
   to ascertain a reference parameter in the reference position,
   to, when the reference parameter does not meet a threshold value, ascertain a lateral desired offset from the reference position, a vertical desired height of the object from the reference position, or both based on the reference parameter,
   to move the object (4) from the reference position to a charging/discharging position with respect to the charging/discharging station (2) based on the lateral desired offset, the vertical desired height, or both and
   to initiate contactless charging or discharging of the object (4) by means of a magnetically coupled coil pair,
   wherein the charging/discharging station (2) has a primary coil (6), the object (4) has a secondary coil (8), and the primary coil and the secondary coil form the coil pair.

* * * * *